United States Patent [19]
Dehart

[11] 4,065,796
[45] Dec. 27, 1977

[54] DIGITAL DATA DECODER

[75] Inventor: Scott Alan Dehart, Loveland, Colo.

[73] Assignee: Hewlett-Packard Company, Palo Alto, Calif.

[21] Appl. No.: 725,210

[22] Filed: Sept. 22, 1976

[51] Int. Cl.² .......................... H04L 7/00; G11B 5/09
[52] U.S. Cl. .................................... 360/51; 178/69.1; 307/232; 307/269
[58] Field of Search ............... 178/69.1; 307/208, 269, 307/232; 179/15 BS; 328/134, 133, 72; 360/51, 53, 42

[56] References Cited

U.S. PATENT DOCUMENTS

| 3,755,798 | 8/1973 | Aguirre | 360/51 |
| 3,979,771 | 9/1976 | Taggart, Jr. et al. | 360/51 |

Primary Examiner—Robert L. Richardson
Attorney, Agent, or Firm—Michael L. Sherrard

[57] ABSTRACT

A digital data decoder for recovering data from magnetic media utilizes a phase-locked loop incorporating a dual slope detecting circuit and a window margin test so as to allow for higher density data and for quality verification of the data without the use of high frequency components.

6 Claims, 5 Drawing Figures

DIGITAL DATA DECODER

BACKGROUND OF THE INVENTION

High density data storage upon magnetic media is traditionally plagued with two problems. The first is in generating the high frequency waveforms required to lock a detector to the input data. The second is the phenomena of "pulse crowding" where transitions written close together upon a magnetic media tend to drift apart. More expensive circuits and components have been used to combat the first problem. Novel data encoding schemes have been the main weapon used against the second. The prior art utilizes a method utilizing a sawtooth-lock waveform and a Miller encoding scheme. This encoding scheme places a transition in the middle of a "bit cell" when a "1" is encoded, and places a transition at the leading edge of a "bit cell" if a "0" is to be encoded and the previous "bit cell" was not a "1." This is further described in U.S. Pat. No. 3,108,261 entitled RECORDING AND/OR REPRODUCING SYSTEM issued to Arthur Miller Oct. 22, 1963. FIG. 1 illustrated an improved (modified Miller or $M^2$) encoding method of a typical bit pattern where a transition is placed at the leading edge of a "bit cell" if a "0" is to be encoded and the previous bit contains no transitions. As can be seen, $M^2$ encoding results in a minimal number of transitions for a given signal while still providing sufficient transitions for detector lock regardless of the data content. It should also be appreciated that the transitions indicating "1's" are subject to "pulse crowding" more than the transitions indicating "0's." The prior art has taken advantage of this characteristic in similar self-clocking codes by designing the detector-lock waveform with larger "windows" for "1" transitions than for the "0" transitions. A typical phase-lock waveform, that is used by Shugart Associates, is illustrated in FIG. 2. The quality of the encoded data is verified by encoding a bit pattern onto the magnetic media, decoding the data and comparing the original bit pattern to the bit pattern subsequently read. The disadvantages of the prior art are twofold. First, the detector-lock waveform requires the generation of extremely high frequencies and is not readily adaptable to further increases in data rates. Secondly, the prior art method of verifying data transfer operation does not detect pulse crowding quantitatively or indicate the vulnerability of certain data to being erroneously decoded in further operations.

SUMMARY OF THE PRESENT INVENTION

The present invention comprises a decoder which utilizes a dual slope low frequency detector-lock waveform and a window margin detector for detecting whether pulse crowding is within predefined limits. This allows for the generation of detector-lock waveforms with lower fundamental frequencies, thus higher data rates with low speed components. Further, data vulnerable to subsequent data errors is detected even though the decoded bit pattern "compares" with the encoded pattern, and the data record thus indicated can be treated as defective so as to insure a high fidelity data storage media.

DESRIPTION OF THE PREFERRED EMBODIMENT

Figure 1:
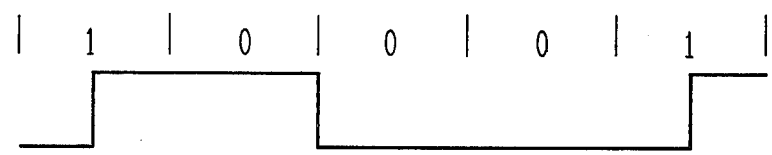
FIG. 1 illustrates a typical $M^2$ encoded digital signal.
Figure 2:
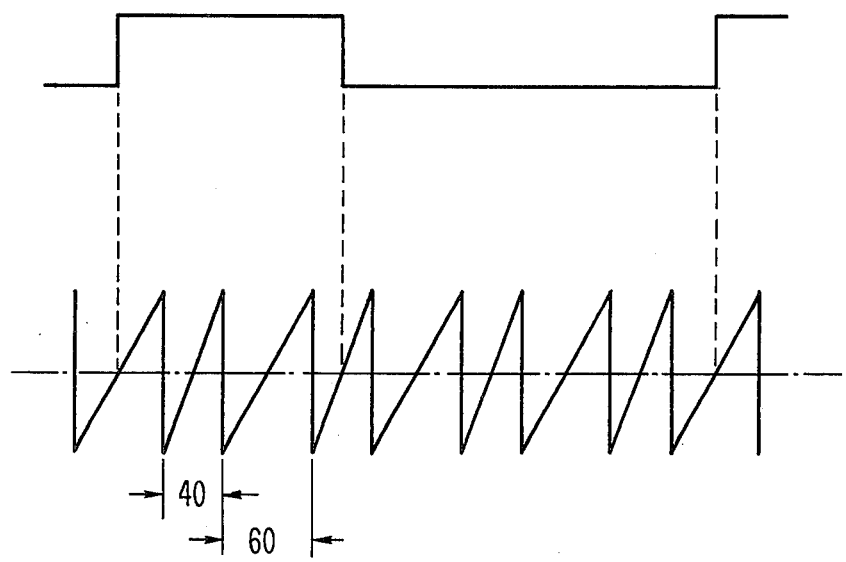
FIG. 2 illustrates a typical prior art phase-lock waveform.
Figure 3:
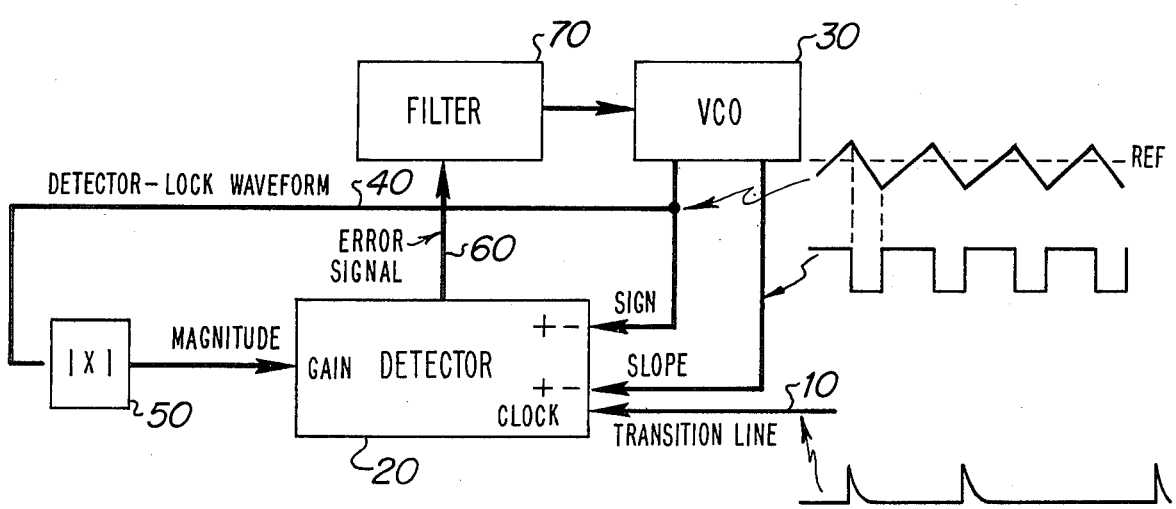
FIG. 3 is a block diagram of the digital data decoder.

Referring to FIG. 3, a block diagram of the present decoder is illustrated. Transitions are detected and appear as positive pulses on TRANSITION LINE 10. The TRANSITION LINE 10 is connected to the clock input which enables DETECTOR 20. A data preamble and a preliminary detector have rough-synchronized the Voltage Controlled Oscillator (VCO) 30 with the data such that "1" transitions occur during the positive sloped portion of detector lock waveform 40 and "0" transitions occur during the negative sloped portion. Subsequently, the detector lock waveform 40 passes through an ABSOLUTE MAGNITUDE DETECTOR 50, which in turn is connected to the GAIN input of DETECTOR 20 to control the magnitude of the error signal 60, representative of the phase error between the data and the detector lock waveform 40. The sign and slope data input to DETECTOR 20 determine the sign of the error signal 60 so as to indicate whether the data transition was "early" or "late." The operation of DETECTOR 20 is illustrated in Truth Table 1.

TRUTH TABLE 1

|  | 1 "early" | 1 "late" | 0 "early" | 0 "late" |
|---|---|---|---|---|
| slope input (+ or −) | + | + | − | − |
| /MAGNITUDE/ (from ref) | x | x | x | x |
| sign (relative to ref) transition (0 to 1) | − 1 | + 1 | + 1 | − 1 |
| ERROR SIGNAL | −x | +x | −x | +x |

Note that an early transition always results in a decrease in the error signal 60, a late transition results in an increased error signal 60. The error signal 60 is low pass filtered by FILTER 70 and then applied to the VCO 30 to correct the frequency of its output waveforms. Thus, the present invention allows the detector to lock upon an input waveform wherein the position of a transition in a "bit cell" is dependent upon the data content and wherein a transition is not necessarily present in every "bit cell."

Figure 5:
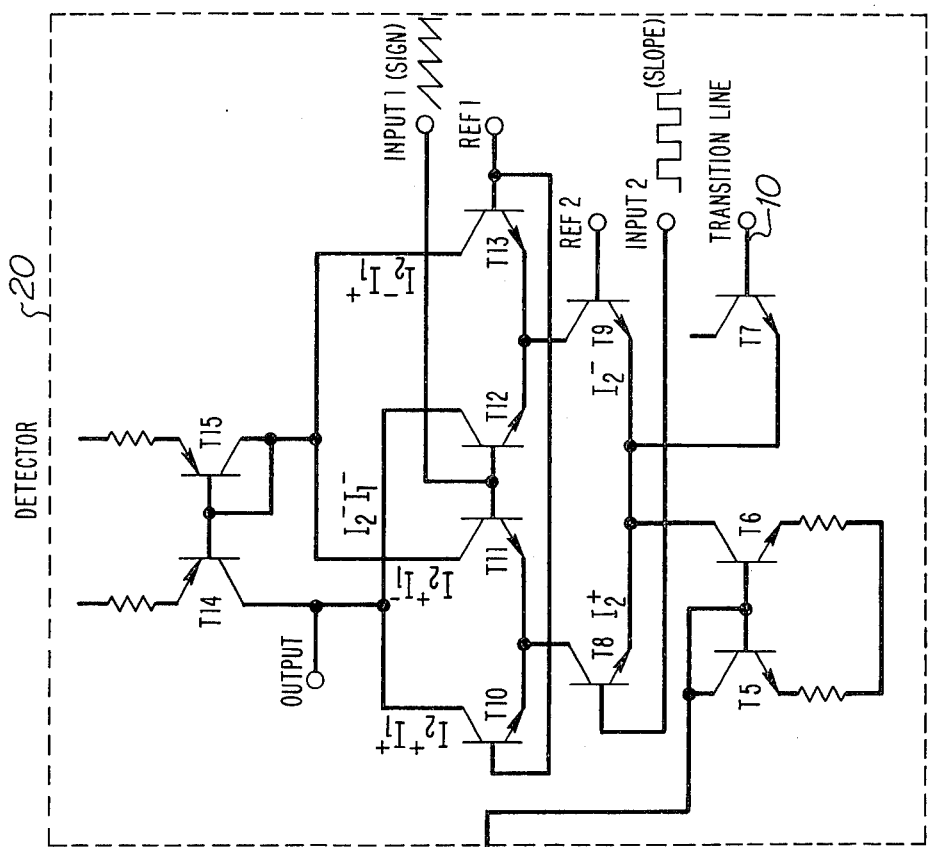
FIG. 5 is a detailed schematic drawing of the magnitude detector and detector of FIG. 3.

The FILTER 70 and the VCO 30 are easily implemented using techniques well known in the art. However, a detailed schematic of the ABSOLUTE MAGNITUDE DETECTOR 50 and DETECTOR 20 is shown in FIG. 5. The detector lock waveform 40 is applied to the input of the ABSOLUTE MAGNITUDE DETECTOR 50. An applied voltage greater than the 5 volt reference voltage will turn on transistor T1 and pull a current through transistors T2, T1 and resistor R. Transistors T2 and T3 comprise a current mirror circuit such that any current flowing through transistor T2 is "mirrored" by an equal current flow through transistor T3. This results in an output current being applied to the output of the ABSOLUTE MAGNITUDE DETECTOR 50, which is proportional to the magnitude of the voltage of the input waveform. An input voltage which is less than the +5 volt reference will turn on transistor T4 which will draw a current through resistor R and produce an output current upon the output of the ABSOLUTE MAGNITUDE DETECTOR 50 which is proportional to the magnitude of the voltage on the input waveform. In all cases the output current from the ABSOLUTE MAGNITUDE DETECTOR 50 has the same polarity.

The input current to DETECTOR 20 is applied to transistor T5. Transistors T5 and T6 comprise a current mirror ciruit such that a current equal to that applied to transistor T5 is also drawn through transistor T6. When transistor T7 is deactivated by a pulse upon transition line 10, the current drawn through transistor T6 is applied to the logic stages of DETECTOR 20 and the detector is enabled. Transistors T8 and T9 comprise a differential amplifier which is the first logic stage of DETECTOR 20. Reference 2, applied to the input of transistor, T9 is selected such that the slope input applied to input 2 will have a value which is either greater or less than the value of reference 2. A relative positive signal on input 2 will activate transistor T8 and the current flowing through transistor T6 will be drawn through transistor T8. A relative negative signal upon input 2 will enable transistor T9 and the current flowing through transistor T6 will also be drawn through transistor T9. Transistors T10 and T11 and also transistors T12 and T13 comprise secondary differential amplifiers which are the second logic stage of DETECTOR 20. The current paths from the different logical combinations of relative signals on inputs 1 and 2 are illustrated on FIG. 5. If the current path includes transistors T10 or T12 the current is drained directly from the output. If the current path includes transistors T11 or T13 the current is drained through transistor T15 which is included in the current mirror circuit with transistor T14. This causes a current of the opposite polarity to be applied to the output of the DETECTOR 20. This results in a output current consisting of a series of pulses in response to the pulses on transistion line 10 such that the algorithm of Truth Table 1 is implemented.

Figure 4:
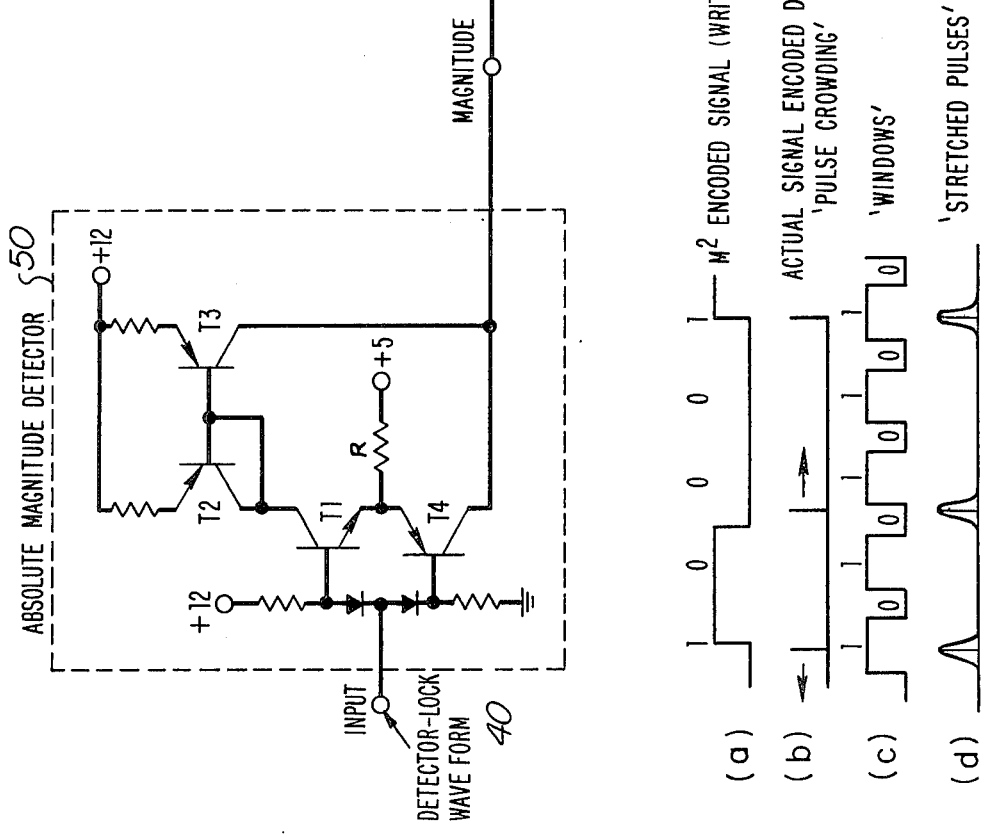
FIG. 4 illustrated waveforms explaining the operation of the window detector.

The window margin detector is best explained by reference to the waveforms of FIG. 4. The detected transitions are stretched by a pulse stretcher to give a signal such as that illustrated in FIG. 4d. This signal is now compared to the SLOPE output of the VCO 30. The transitions of the SLOPE output of the VCO 30 define the window within which a transition must occur to be properly decoded, and the duration of the stretched pulse determines the selected margin indicative of the minimum quality allowed for data to pass the window margin test. This is implemented by detecting transitions during a stretched pulse. Any detection of such a transition indicates a transition occurring so close to a window boundary that subsequent data retrieval operations on the same or compatible devices may result in an error. The present invention therefore labels the related data segment as defective and does not allow its use for data storage.

I claim:

1. A synchronizer responsive to an input signal, which includes a sequence of reproducible changes; the synchronizer comprising:
    a variable oscillator having an input and first and second outputs, for producing a periodic triangle waveform on the first output having a frequency responsive to a signal applied to the input, and for producing a signal on the second output having a first or a second value corresponding to a positive or negative slope on the first output, respectively;
    a magnitude detector with an input and an output, the input responsive to the first output of said variable oscillator, for producing an output signal responsive to the absolute magnitude of the difference between the input thereto and a reference value;
    circuit means with first and second inputs coupled to the first and second outputs of said variable oscillator, respectively, a third input coupled to the output of said magnitude detector, a fourth input responsive to the input signal, and an output, for generating an output signal upon the detection of a reproducible change upon the fourth input, the output signal having a magnitude responsive to the third input and having a first polarity if the first input is greater than the reference value and the second input has the first value, having a first polarity if the first input is less than the reference voltage and the second input has the second value, having a second polarity in other cases;
    a filter with an input coupled to the output of said detector and an output coupled to the input of said variable oscillator for low pass filtering the signal thereto and producing an output representative of the low pass fltered input.

2. A synchronizer as in claim 1 wherein the ratio of the durations of the first to the second value on the second output of the variable oscillator has a ratio of from 50-50 to 70-30, respectively.

3. A synchronizer as in claim 2 wherein the reproducible changes are pulses.

4. A test interval margin detector responsive to a self-clocking digital signal representing a series of binary digits, the digits being either a first or a second digit, the digital signal comprising a time series of clock periods with reproducible changes occurring at selected first or second times therein, the detector comprising:
    pulse means responsive to said self-clocking digital signal for producing an output pulse of selected duration upon the appearance of a reproducible change upon the input thereof;
    gating means with an input and an output, the input responsive to the self-clocking digital signal, for producing an output sequence of test intervals in time, test intervals being centered about output pulses responsive to reproducible changes occurring at the first and second times in each clock period; and
    detector means with inputs coupled to said gating means and to said pulse means for producing an error indication upon detection of a test interval boundary occurring durng an output pulse.

5. A detector as in claim 4 wherein the test intervals centered about outputs pulses responsive to reproducible changes occurring at the first and second times have first and second durations, respectively.

6. A detector as in claim 5 where the sum of a first and second duration is substantially equal to the duration of a clock period.

* * * * *